United States Patent
Su et al.

(10) Patent No.: US 9,432,694 B2
(45) Date of Patent: Aug. 30, 2016

(54) SIGNAL SHAPING TECHNIQUES FOR VIDEO DATA THAT IS SUSCEPTIBLE TO BANDING ARTIFACTS

(71) Applicant: Apple Inc., Cupertino, CA (US)

(72) Inventors: Yeping Su, Sunnyvale, CA (US); Hao Pan, Sunnyvale, CA (US); Ke Zhang, Leuven (BE); Douglas Scott Price, San Jose, CA (US); James Oliver Normile, Los Altos, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 13/631,428

(22) Filed: Sep. 28, 2012

(65) Prior Publication Data

US 2013/0235942 A1    Sep. 12, 2013

Related U.S. Application Data (60) Provisional application No. 61/607,484, filed on Mar. 6, 2012.

(51) Int. Cl.
*H04N 19/577*    (2014.01)
*H04N 19/139*    (2014.01)
(Continued)

(52) U.S. Cl.
CPC .......... *H04N 19/577* (2014.11); *H04N 19/107* (2014.11); *H04N 19/117* (2014.11); *H04N 19/124* (2014.11); *H04N 19/139* (2014.11); *H04N 19/149* (2014.11); *H04N 19/15* (2014.11); *H04N 19/154* (2014.11);
(Continued)

(58) Field of Classification Search
CPC ..... H04N 19/00909; H04N 1/00; H04N 5/21; G06T 2207/20172
USPC ........................................................ 375/240
See application file for complete search history.

(56) References Cited

U.S. PATENT DOCUMENTS

| 7,394,856 B2 | 7/2008 | Bhaskaran |
| 8,009,963 B2 | 8/2011 | Panda et al. |

(Continued)

FOREIGN PATENT DOCUMENTS

WO    2011/081637 A1    7/2011

OTHER PUBLICATIONS

R.Gaetano, G.Poggi, G.Scarpa, "Identification of Image Structure by the Mean Shift Procedure for Hierarchical MRF-Based Image Segmentation",14th European Signal Processing Conference (EUSIPCO 2006), Florence, Italy, Sep. 4-8, 2006, copyright by EURASIP.*

(Continued)

*Primary Examiner* — Sath V Perungavoor
*Assistant Examiner* — Clifford Hilaire
(74) *Attorney, Agent, or Firm* — Baker & Hostetler, LLP (57) ABSTRACT

Video coding systems and methods protect against banding artifacts in decoded image content. According to the method, a video coder may identify, from content of pixel blocks of a frame of video data, which pixel blocks are likely to exhibit banding artifacts from the video coding/decoding processes. The video coder may assemble regions of the frame that are likely to exhibit banding artifacts based on the identified pixel blocks' locations with respect to each other. The video coder may apply anti-banding processing to pixel blocks within one or more of the identified regions and, thereafter, may code the processed frame by a compression operation.

17 Claims, 3 Drawing Sheets

(51) Int. Cl.

| | |
|---|---|
| *H04N 19/172* | (2014.01) |
| *H04N 19/149* | (2014.01) |
| *H04N 19/15* | (2014.01) |
| *H04N 19/107* | (2014.01) |
| *H04N 19/117* | (2014.01) |
| *H04N 19/124* | (2014.01) |
| *H04N 19/154* | (2014.01) |
| *H04N 19/156* | (2014.01) |
| *H04N 19/192* | (2014.01) |
| *H04N 19/58* | (2014.01) |
| *H04N 19/46* | (2014.01) |

(52) U.S. Cl.
CPC ......... *H04N 19/156* (2014.11); *H04N 19/172* (2014.11); *H04N 19/192* (2014.11); *H04N 19/58* (2014.11); *H04N 19/46* (2014.11)

(56) References Cited

U.S. PATENT DOCUMENTS

| | | |
|---|---|---|
| 8,094,715 B2 | 1/2012 | Fukuta et al. |
| 8,107,571 B2 | 1/2012 | Sullivan et al. |
| 8,126,283 B1 | 2/2012 | Garbacea et al. |
| 8,532,198 B2 * | 9/2013 | Kumwilaisak ......... G06T 7/403 375/240.08 |
| 2006/0050984 A1 * | 3/2006 | Tilton ................. G06K 9/0063 382/275 |
| 2007/0064816 A1 | 3/2007 | Chiang et al. |
| 2007/0274606 A1 * | 11/2007 | Thurston ................ G06T 5/005 382/275 |
| 2009/0086816 A1 | 4/2009 | Leontaris et al. |
| 2009/0148058 A1 | 6/2009 | Dane et al. |
| 2010/0135575 A1 * | 6/2010 | Guo ....................... G06T 7/0081 382/164 |
| 2011/0129020 A1 * | 6/2011 | Li ......................... G06T 7/0002 375/240.29 |
| 2013/0044813 A1 | 2/2013 | Boon et al. |
| 2014/0146885 A1 | 5/2014 | Park et al. |

OTHER PUBLICATIONS

Gaetano, R., G. Poggi, and G. Scarpa. "Identification of image structure by the Mean Shift procedure for hierarchical MRF-based image segmentation." Signal Processing Conference, 2006 14th European. IEEE, 2006.*

Chen et al., "Comments on Clean Decoding Refresh Pictures", JCTV-E400, 5th Meeting: Geneva, CH, Mar. 16-23, 2011, pp. 1-4.

Fujibayashi et al., "Random access support for HEVC", JCTVC-D234, 4th Meeting: Daegu, Korea, Jan. 20-28, 2011, pp. 1-8.

* cited by examiner

SIGNAL SHAPING TECHNIQUES FOR VIDEO DATA THAT IS SUSCEPTIBLE TO BANDING ARTIFACTS

CROSS-REFERENCE TO RELATED APPLICATION

This application claims the benefit of priority afforded by provisional application Ser. No. 61/607,484, filed Mar. 6, 2012, entitled "Improvements in Video Preprocessors and Video Coders."

BACKGROUND

In video coder/decoder systems, a video coder may code a source video sequence into a coded representation that has a smaller bit rate than does the source video and, thereby may achieve data compression. The video coder may code processed video data according to any of a variety of different coding techniques to achieve compression. One common technique for data compression uses predictive coding techniques (e.g., temporal/motion predictive coding). For example, some frames in a video stream may be coded independently (I-frames) and some other frames (e.g., P-frames or B-frames) may be coded using other frames as reference frames. P-frames may be coded with reference to a single previously coded frame (called, a "reference frame") and B-frames may be coded with reference to a pair of previously-coded reference frames, typically a reference frame that occurs prior to the B-frame in display order and another reference frame that occurs subsequently to the B-frame in display order. The resulting compressed sequence (bit stream) may be transmitted to a decoder via a channel. To recover the video data, the bit stream may be decompressed at the decoder by inverting the coding processes performed by the coder, yielding a recovered video sequence.

To achieve high compression, the video coding processes typically are "lossy;" they permit a video decoder to recover a video sequence that is a replica of the source video sequence but has some errors. Thus, video coding systems often produce images with various types of coding artifacts including loss of detail, blockiness, ringing and banding. Such artifacts generally are more noticeable in still image content than in image content that exhibits a high degree of motion. Designers of video coding systems endeavor to provide coding systems that maintain high quality at appropriate bitrates and, therefore, avoid such display artifacts.

DETAILED DESCRIPTION

Embodiments of the present invention provide video coding systems and methods that protect against banding artifacts in decoded image content. According to the method, a video coder may identify from the content of pixel blocks of a frame of video data which pixel blocks are likely to exhibit banding artifacts from the video coding/decoding processes. The video coder may identify regions of the frame that are likely to exhibit banding artifacts based on the identified pixel blocks' locations with respect to each other. The video coder may apply anti-banding processing to pixel blocks within one or more of the identified regions and, thereafter, may code the processed frame by a compression operation.

Figure 1:
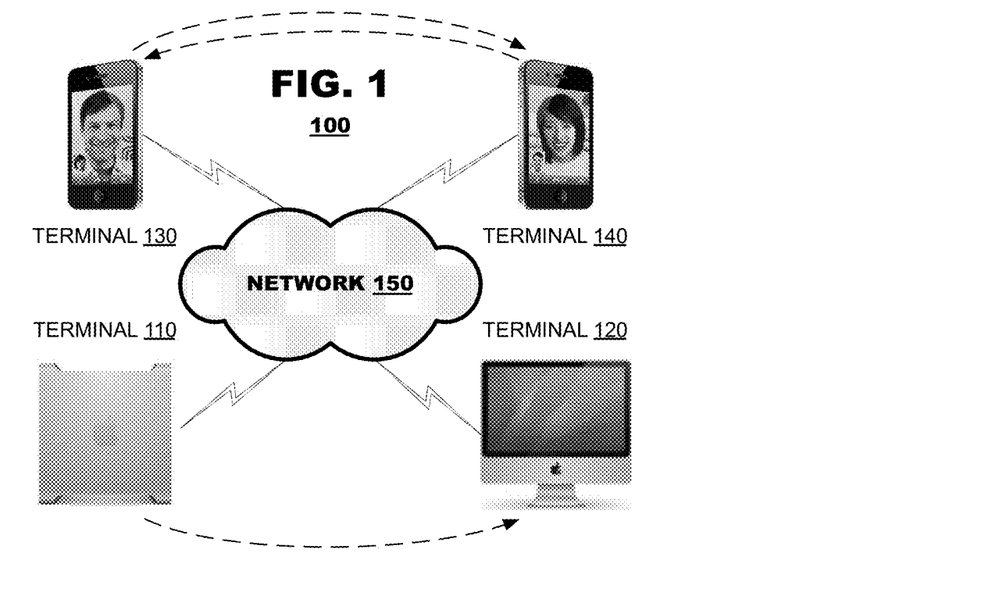
FIG. 1 is a simplified block diagram of a video coding system according to an embodiment of the present invention.

FIG. 1 is a simplified block diagram of a video coding system 100 according to an embodiment of the present invention. The system 100 may include at least two terminals 110-120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission is common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 are illustrated as servers, personal computers and smart phones but the principles of the present invention are not so limited. Embodiments of the present invention find application with laptop computers, tablet computers, media players and/or dedicated video conferencing equipment. The network 150 represents any number of networks that convey coded video data among the terminals 110-140, including, for example, wireline and/or wireless communication networks. The communication network 150 may exchange data in circuit-switched and/or packet-switched channels. Representative networks include telecommunications networks, local area networks, wide area networks and/or the Internet. For the purposes of the present discussion, the architecture and topology of the network 150 are immaterial to the operation of the present invention unless explained hereinbelow.

Figure 2:
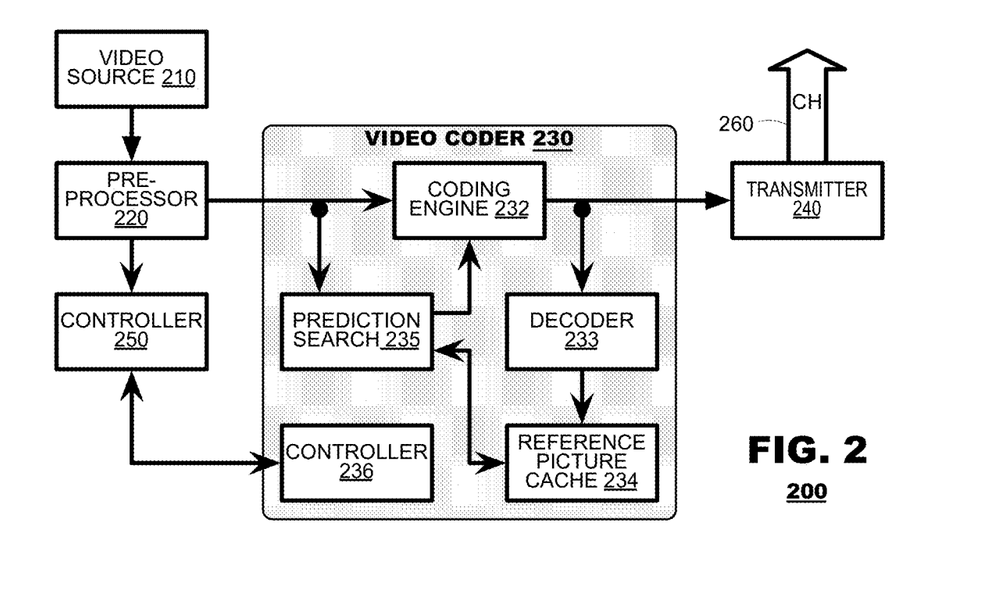
FIG. 2 is a functional block diagram of a video coding system according to an embodiment of the present invention.

FIG. 2 is a functional block diagram of a video coding system 200 according to an embodiment of the present invention. The system 200 may include a video source 210 that provides video data to be coded by the system 200, a pre-processor 220, a video coder 230, a transmitter 240 and a controller 250 to manage operation of the system 200.

The video source 210 may provide video to be coded by the rest of the system 200. In a media serving system, the video source 210 may be a storage device storing previously prepared video. In a videoconferencing system, the video source 210 may be a camera that captures local image information as a video sequence. Video data typically is provided as a plurality of individual frames that impart motion when viewed in sequence. The frames themselves typically are organized as a spatial array of pixels.

The pre-processor 220 may perform various analytical and signal conditioning operations on video data. The pre-processor 220 may parse input frames into color components (for example, luminance and chrominance components) and also may parse the frames into pixel blocks, spatial arrays of pixel data, which may form the basis of further coding. The preprocessor 220 also may apply various filtering operations to the frame data to improve efficiency of coding operations applied by a video coder 230.

The pre-processor 220 also may search for video content in the source video sequence that is likely to generate artifacts when the video sequence is coded by the system 200, then decoded and displayed by another terminal. "Banding" is one of the artifacts that the pre-processor 220 may identify. Banding may occur in areas of source frames that are generally smooth and exhibit a gradual transition within the area. When such frames are coded, then decoded and displayed, a gradual transition may not be preserved; instead, the transition may be displayed as a plurality of discrete changes in the area of the reconstructed frame. The pre-processor 220 may identify to the controller 250 portions of the video sequence in which banding artifacts may arise.

The video coder 230 may perform coding operations on the video sequence to reduce the video sequence's bit rate. The video coder 230 may include a coding engine 232, a local decoder 233, a reference picture cache 234, a predictor 235 and a controller 236. The coding engine 232 may code the input video data by exploiting temporal and spatial redundancies in the video data and may generate a datastream of coded video data, which typically has a reduced bit rate as compared to the datastream of source video data. As part of its operation, the video coder 230 may perform motion compensated predictive coding, which codes an input frame predictively with reference to one or more previously-coded frames from the video sequence that were designated as "reference frames." In this manner, the coding engine 232 codes differences between pixel blocks of an input frame and pixel blocks of reference frame(s) that are selected as prediction reference(s) to the input frame.

The local decoder 233 may decode coded video data of frames that are designated as reference frames. Operations of the coding engine 232 typically are lossy processes. When the coded video data is decoded at a video decoder (not shown in FIG. 2), the recovered video sequence typically is a replica of the source video sequence with some errors. The local decoder 233 replicates decoding processes that will be performed by the video decoder on reference frames and may cause reconstructed reference frames to be stored in the reference picture cache 234. In this manner, the system 200 may store copies of reconstructed reference frames locally that have common content as the reconstructed reference frames that will be obtained by a far-end video decoder (absent transmission errors).

The predictor 235 may perform prediction searches for the coding engine 232. That is, for a new frame to be coded, the predictor 235 may search the reference picture cache 234 for image data that may serve as an appropriate prediction reference for the new frames. The predictor 235 may operate on a pixel block-by-pixel block basis to find appropriate prediction references. In some cases, as determined by search results obtained by the predictor 235, an input frame may have prediction references drawn from multiple frames stored in the reference picture cache 234.

The controller 236 may manage coding operations of the video coder 230, including, for example, selection of coding parameters to meet a target bit rate of coded video. Typically, video coders operate according to constraints imposed by bit rate requirements, quality requirements and/or error resiliency policies; the controller 236 may select coding parameters for frames of the video sequence in order to meet these constraints. For example, the controller 236 may assign coding modes and/or quantization parameters to frames and/or pixel blocks within frames.

The transmitter 240 may buffer coded video data to prepare it for transmission to the far-end terminal (not shown). The transmitter 240 may merge coded video data from the video coder 230 with other data to be transmitted to the terminal, for example, coded audio data and/or ancillary data streams (sources not shown).

The controller 250 may manage operation of the system 200. During coding, the controller 250 may assign to each frame a certain frame type (either of its own accord or in cooperation with the controller 236), which can affect the coding techniques that are applied to the respective frame. For example, frames often are assigned as one of the following frame types:

- An Intra Frame (I frame) is one that is coded and decoded without using any other frame in the sequence as a source of prediction,
- A Predictive Frame (P frame) is one that is coded and decoded using earlier frames in the sequence as a source of prediction.
- A Bidirectionally Predictive Frame (B frame) is one that is coded and decoded using both earlier and future frames in the sequence as sources of prediction.

Frames commonly are parsed spatially into a plurality of pixel blocks (for example, blocks of 4×4, 8×8 or 16×16 pixels each) and coded on a pixel block-by-pixel block basis. Pixel blocks may be coded predictively with reference to other coded pixel blocks as determined by the coding assignment applied to the pixel blocks' respective frames. For example, pixel blocks of I frames can be coded non-predictively or they may be coded predictively with reference to pixel blocks of the same frame (spatial prediction). Pixel blocks of P frames may be coded non-predictively, via spatial prediction or via temporal prediction with reference to one previously coded reference frame. Pixel blocks of B frames may be coded non-predictively, via spatial prediction or via temporal prediction with reference to one or two previously coded reference frames.

Figure 3:
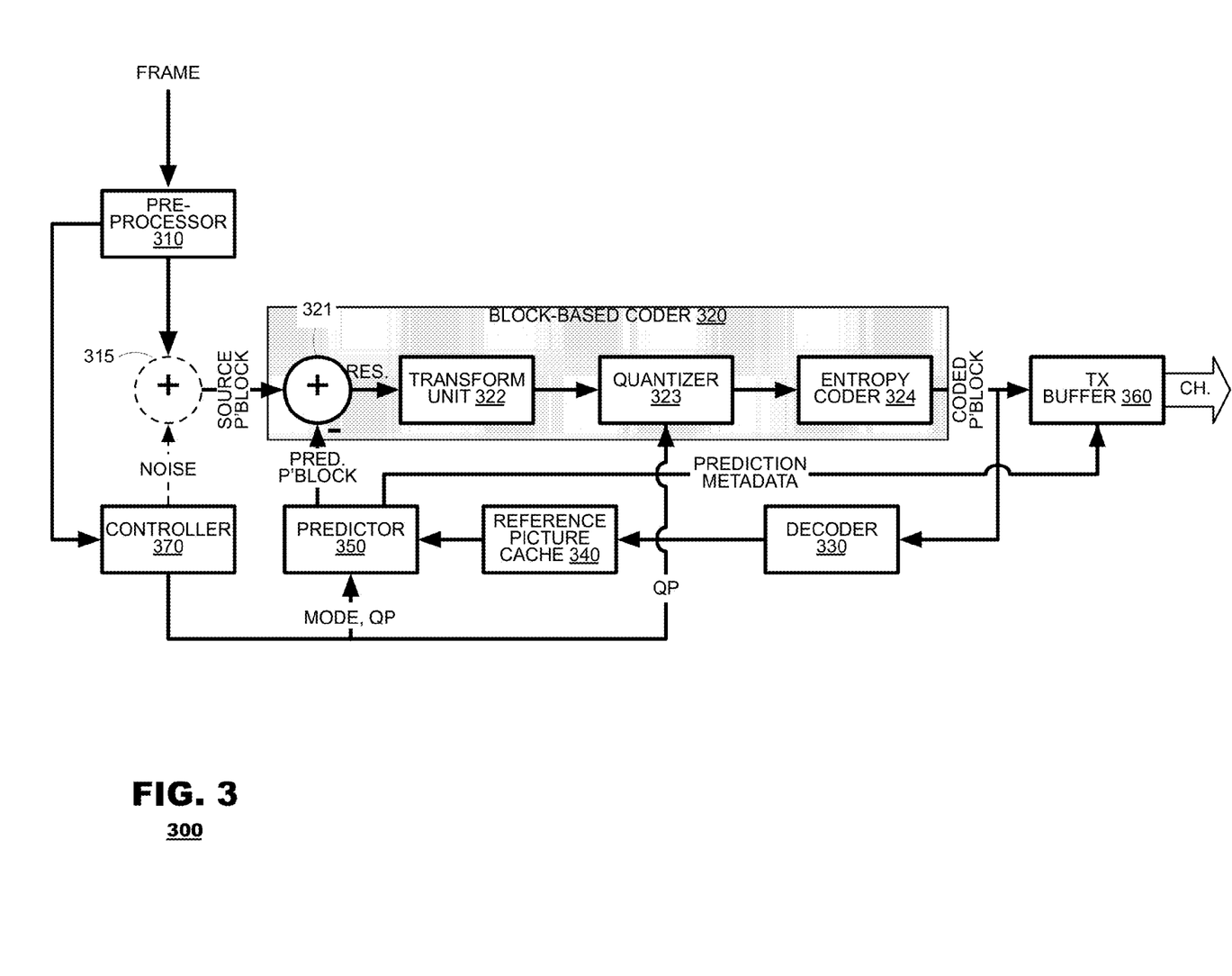
FIG. 3 is a simplified block diagram of a video coding system of another embodiment of the present invention.

FIG. 3 is a simplified block diagram of a video coding system 300 of another embodiment of the present invention, illustrating the operation of pixel-block coding operations. The system 300 may include a pre-processor 310, a block-based coder 320, a reference frame decoder 330, a reference picture cache 340, a predictor 350, a transmit buffer 360 and a controller 370.

As discussed above, the pre-processor 310 may parse each frame into pixel blocks. The pre-processor 310 also may identify regions within frames in which banding is likely to occur and it may identify such regions to a controller 370.

The block-based coder 320 may include a subtractor 321, a transform unit 322, a quantizer 323 and an entropy coder 324. The subtractor 321 may generate data representing a difference between the source pixel block and a reference pixel block developed for prediction. The subtractor 321 may operate on a pixel-by-pixel basis, developing residuals at each pixel position over the pixel block. Non-predictively coded blocks may be coded without comparison to reference pixel blocks, in which case the pixel residuals are the same as the source pixel data.

The transform unit 322 that may convert the source pixel block data to an array of transform coefficients, such as by a discrete cosine transform (DCT) process or a wavelet transform. The quantizer unit 323 may quantize (divide) the transform coefficients obtained from the transform unit 322 by a quantization parameter Qp. The entropy coder 324 may code quantized coefficient data by run-value coding, run-length coding or the like. Data from the entropy coder may be output to the channel as coded video data of the pixel block. The reference frame decoder 330 may decode pixel blocks of reference frames and assemble decoded data for such reference frames. Decoded reference frames may be stored in the reference picture cache 340.

The predictor 350 may generate and output prediction blocks to the subtractor 321. The predictor 350 also may output metadata identifying type(s) of predictions performed. For inter-prediction coding, the predictor 350 may search among the reference picture cache for pixel block data of previously coded and decoded frames that exhibits strong correlation with the source pixel block. When the predictor 350 finds an appropriate prediction reference for the source pixel block, it may generate motion vector data that is output to the decoder as part of the coded video data stream. The predictor 350 may retrieve a reference pixel block from the reference cache that corresponds to the motion vector and may output it to the subtractor 321. For intra-prediction coding, the predictor 350 may search among the previously coded and decoded pixel blocks of the same frame being coded for pixel block data that exhibits strong correlation with the source pixel block. Operation of the predictor 350 may be constrained by a mode selection provided by the controller 370. For example, if a controller selects an inter-coding mode for application to a frame, the predictor 350 will be constrained to use inter-coding techniques. If the controller selects an inter-prediction mode for the frame, the predictor may select among inter-coding modes and intra-coding modes depending upon results of its searches.

A transmit buffer 360 that accumulates metadata representing pixel block coding order, coded pixel block data and metadata representing coding parameters applied to the coded pixel blocks. The metadata can include prediction modes, motion vectors and quantization parameters applied during coding. Accumulated data may be formatted and transmitted to the channel.

A controller 370 to manage coding of the source video, including selection of a coding mode for use by the predictor 350 and selection of quantization parameters to be applied to pixel blocks.

Figure 4:
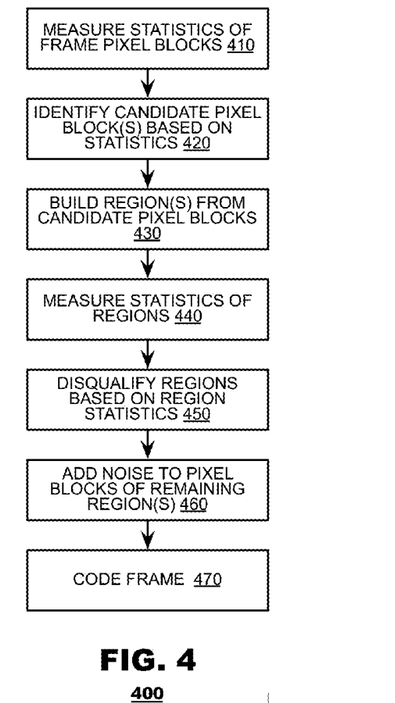
FIG. 4 illustrates a method of detecting banding artifacts in source video and coding such video according to an embodiment of the present invention.

FIG. 4 illustrates a method 400, according to an embodiment of the present invention, of detecting banding artifacts in source video and coding the video to mitigate such effects. The method 400 may begin by measuring statistics of pixel blocks within a source frame (box 410) and identifying candidate pixel blocks from those statistics (box 420). Candidate pixel blocks will be those pixel blocks whose statistics indicate a reasonable risk to exhibit banding artifacts. The method 400 may assemble the candidate pixel blocks into regions (box 430). For example, when any two candidate pixel blocks shared a common edge, they can be combined into a common region. Once the regions are assembled, the method 400 may measure statistics of the regions (box 440) and disqualify certain regions and/or pixel blocks from anti-banding processing based on those statistics (box 450). Thereafter, pixel blocks of remaining regions may have banding amelioration techniques applied to them (box 460). Finally, the method 400 may cause the frame to be coded (box 470), including the pixel blocks of the regions.

To detect pixel blocks that are at risk for banding, the method 400 may search for pixel blocks that have smooth video content. Several techniques are available to detect such pixel blocks. The method 400 may compute means and/or variances of image data of each pixel block and compare those values to predetermined thresholds to determine whether individual pixel blocks should be designated as candidates. In addition, the method 400 may consider differences among these values between pixel blocks to determine whether individual pixel blocks are sufficiently smooth that they should be designated as candidates. As another technique, the method 400 may perform frequency analyses of pixel blocks' content, for example, by DCTs and/or wavelet transforms, and may consider distribution of energies among high frequency and low frequency coefficients of such transforms. A pixel block whose DC and low frequency coefficients have high energy as compared to low frequency coefficients of the pixel block or whose high frequency coefficients are lower than a predetermined threshold may be considered appropriate candidates.

Figure 5:
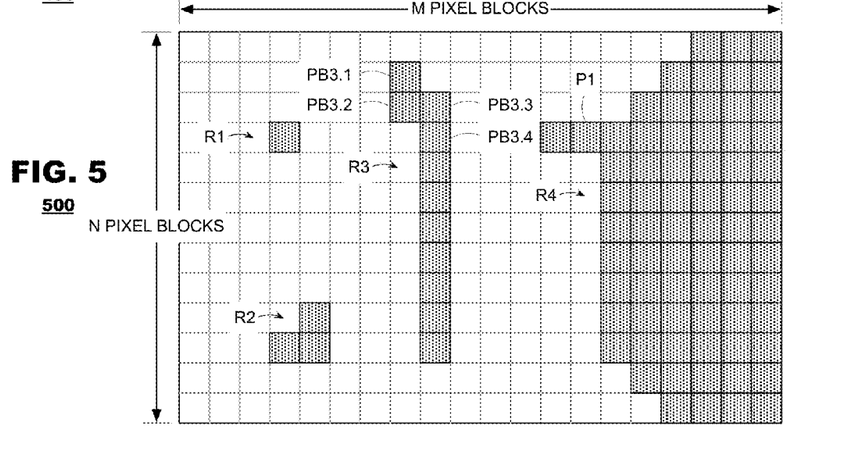
FIG. 5 illustrates an exemplary frame of video data.

FIG. 5 illustrates operation of the method of FIG. 4 on an exemplary frame of video data. As illustrated, the frame 500 may have been parsed into a predetermined number of pixel blocks, say M columns and N rows of pixel blocks. In FIG. 5, the pixel blocks identified with shading represent pixel blocks that may have been identified in box 420 as pixel blocks that may exhibit banding artifacts.

As discussed, during operation of box 430, the method 400 may assemble candidate pixel blocks into regions. Any two candidate pixel blocks may be joined to a common region if they share a border in common. The method 400 may operate recursively, adding increasing numbers of candidate pixel blocks to a given region until the region has no other pixel blocks on its edges that are candidates for banding artifacts. Four regions, R1-R4, are illustrated in FIG. 5 that may be constructed from the candidate pixel blocks.

In indicated, once the pixel blocks are assembled into regions, the method 400 may consider statistics of the regions to determine whether to disqualify certain regions from further anti-banding processing. Several metrics may be used for this purpose, for example:

Size: The method may disqualify regions when the number of pixel blocks in the respective region is less than a predetermined threshold. In the example of FIG. 5, if the threshold number of blocks were set to 10, then regions R1 and R2 might be eliminated.

Shape: The method may disqualify regions based on their shape. For example, the method may require that each region have height and a width that exceeds certain thresholds. For example, if a region were required to have a width and a height that are both greater than three pixel blocks, regions R1-R3 would be disqualified.

DC Differences Among Blocks: The method may compare DC coefficients among pixel blocks within a region to determine whether to disqualify the region from further processing. DC coefficients may be obtained by averaging image content of each pixel block. If block-to-block DC coefficient changes exceed a predetermined threshold or if the DC coefficient changes occur in a non-uniform manner (e.g., they change signs from block to block), then pixel blocks of a region may be disqualified from further processing.

Mean and Variance Comparisons: The method may calculate the means and variances for image content of individual pixel blocks and compare those values to a mean and variance of all image content in the region. If pixel blocks' means and/or variances differ from the mean and/or variance of the region as a whole, the region may be disqualified from further anti-banding processing.

Temporal Persistence: The method 400 may calculate each region's persistence over time. Candidate regions that are present across a relatively small number of adjacent frames may not be present for a sufficiently long time to be perceived as an annoying artifact by a viewer. By contrast, candidate regions that are present for a sufficient number of frames—for example, for a second or longer after decoding and display—may remain candidates for anti-banding processing.

Of course, the method 400 may combine these different metrics to determine when to disqualify regions from anti-banding processing.

In another embodiment, the method 400 may consider some of its metrics as part of the process of growing regions from individual candidate pixel blocks. Consider region R3 as an example. The region R3 may be created by considering pixel blocks PB3.1 and PB3.2 in a first iteration, then expanding to consider pixel blocks PB3.3, PB3.4, etc. As a new pixel block (say, PB3.3) is considered for admission to the region R3, the method 400 may compare metrics of the candidate pixel block PB3.3 to metrics of the pixel blocks in the region R3 and may decide whether to accept or reject the pixel block for admission to the region R3 on the basis of the comparison. For example, the method may consider the mean and variance of pixel content within the candidate pixel block PB3.3 to the mean and variance of pixel content of other pixel blocks (PB3.1, PB3.2, in this example) already admitted to the region R3. If the means and variances are sufficiently similar, the candidate pixel block PB3.3 may be admitted.

Even when the method 400 considers pixel block metrics as part of the process of growing regions, the method 400 may consider still other metrics after conclusion of the region growing process. For example, disqualification processes that are based on a region's shape, size and/or temporal persistence likely will be performed after the region growing process concludes.

In other embodiments of the present invention, the method 400 may use the foregoing metrics to determine whether to remove certain pixel blocks from a region. In such embodiments, pixel blocks may be removed from a region but remaining pixel blocks of the region may be subject to anti-banding processing. Using size and shape as an example, the method may determine whether a portion of a region includes a projection that has a size and shape that are unlikely to exhibit banding artifacts even though the remainder of the region could exhibit such artifacts (shown as P1, for example, in region R4). In this case, the pixel blocks belonging to the projection may be removed from the regions but the remainder of the regions still may be a candidate for anti-band processing.

In another embodiment, rather than adding noise to pixel blocks of regions subject to anti-banding processing, the method 400 may apply different types of filtering to anti-banding regions that are applied to other pixel blocks. Generally, a pre-processor may apply filtering, including denoising filtering, to source video to render video coding more efficient. When regions are identified that are to be subjected to anti-banding processing, application of denoising filters to anti-banding regions of a frame may be altered to preserve any dither noise that appears naturally in the source frame. In one example, the denoising filter may be disabled entirely for such regions but, in others, a strength of filtering may be diminished as compared to a strength of filtering applied to image content outside the anti-banding regions.

As discussed, once the region growing process is completed, the method 400 may apply anti-banding processes to pixel blocks within the region to protect against banding artifacts. Several techniques are available to protect against banding, including for example:

A video coding system 300 may add an amount of dither noise to pixel blocks within the region prior to coding. FIG. 3 illustrates an adder 315 for this purpose. The controller 370 may select a noise profile and amplitude based on an estimate of the smoothness of image data within the region and an orientation of banding artifacts that are likely to arise. For example, a first noise profile may be selected if the banding artifacts are estimated to have a vertical profile within the region (appearing as vertical stripes when display), a second noise profile may be selected if the banding artifacts are estimated to have a horizontal profile. Other noise profiles may be selected for other banding patterns within the region (arcs, radial patterns, etc.).

A video coder 300 may alter quantization of pixel blocks that are subject to anti-banding processing. Pixel blocks that fall within regions may be assigned relatively lower quantization parameters than pixel blocks that do not fall within regions. By lowering quantization parameters for such pixel blocks, it increases the likelihood that pixel block residuals will not be truncated to zero by the quantization parameter. Thus, when the pixel block is coded, a controller 370 may alter a quantization parameter as applied to the quantizer 323.

A video coder 300 may vary an amount of filtering to be applied to pixel blocks that are members of such regions. In this manner, when a video coder 300 determines that a given pixel block is a member of a region for which anti-banding processing is to be performed, the video coder 300 may disable or lower the strength of filtering that otherwise might be applied by a pre-processor 310 to the pixel block. As noted, a pre-processor 310 ordinarily may filter pixel block data to condition it for coding. Anti-noise filters are members of one such class of filters that a pre-processor 310 may apply. Such filters typically improve coding efficiency by diminishing high frequency image content of pixel blocks. In the case of smooth image regions, however, such filters may increase the likelihood that banding artifacts may arise and, therefore, they may be disabled or diminished in filtering strength. Moreover, a pre-processor 310 may vary an amount of filtering applied to pixel blocks within an anti-banding region based on an amount of noise that is estimated to be present in the source signal.

A pre-processor 310 may vary an amount of filtering applied to portions of frame data based on characteristics and viewing conditions of a display as estimated by an encoder. For example, an encoder may revise filtering strengths based on information representing size of a display at a decoder. Thus, a different level of filtering may be applied when an encoder codes video for a handheld device with a 2-3 inch diagonal display than when the encoder codes the same video for a tablet or personal computer having a 10-15 inch diagonal display.

A pre-processor 310 may vary an amount of filtering applied to portions of frame data based on perceptual masking value estimates for each portion of image data, with the perceptual mask indicating how easily a loss of signal content can be observed.

The regions may constitute a detection map with multiple levels of granularity, which further may be linear or nonlinear lowpass filtered or morphologically filtered from an initial binary detection map. Combined with the alpha blending technique, a detection map with multiple levels of granularity may prevent generating undesirable yet visible abrupt transitions between a detected banding region and its neighboring non-detected region.

The detection map further may be filtered temporally to increase consistency in time.

A pre-processor may vary an amount of filtering applied to portions of frame data based on indicators from a face detector (not shown)—portions that are identified as representing frame data may have relatively higher quality filtering than other regions of the frame. Faces often represent areas of image content having the highest level of interest when recovered video is rendered at a display of a decoder. Therefore, a different level of filtering may be applied for areas detected to represent human faces than for other areas that may represent background or other content.

A pre-processor may vary an amount of filtering applied to portions of frame data based on indications from a rate controller, identifying a bit budget of a given picture and bitrate generated in a previous encoding pass. As indicated, stronger filters may reduce noise in image content at a greater rate than weaker filters but may incur a coding cost at a lower bitrate than may be required to code the noisier image content. If a rate controller indicates that a relatively low number of bits are available for coding, filtering strengths may be increased whereas; if the rate controller indicates that a relatively high number of bits are available for coding, filtering strengths may be lowered.

The amount of the pre-processing filtering may be controlled by the quantization parameter and/or other bitstream syntax statistics collected in a previous encoding pass of a multi-pass video coder. For example, in a multi-pass coder, an encoder may estimate image statistics (such as spatial complexity) and generate quantization parameters for various portions of the video sequence. Before performing another pass of coding the same sequence, filtering strengths may be adjusted based on observed costs of coding in the first pass. Filtering strengths may be increased for portions of the video sequence that were observed to require relatively high bit rates in a prior coding pass, whereas filtering strengths may be lowered for portions of the video sequence that were observed to require relatively low bit rates.

The foregoing discussion has described operation of the embodiments of the present invention in the context of coders and decoders. Commonly, video coders are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronics devices, such as gaming systems, DVD players, portable media players and the like and they also can be packaged in consumer software applications such as video games, browser-based media players and the like.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
   identifying, from content of pixel blocks of a frame of video data, candidate pixel blocks that are likely to exhibit banding artifacts from a video coding/decoding process;
     identifying regions of the frame that are likely to exhibit banding artifacts based on the identified pixel blocks' locations with respect to each other, the identifying regions including:
     identifying regions of the frame that are likely to exhibit banding artifacts based on the identified pixel blocks' locations with respect to each other, the identifying regions including:
       recursively joining a candidate pixel block to a respective region, starting with a seed candidate pixel block, by:
       comparing metrics of a respective region to metrics of a candidate pixel block that shares a border with a pixel block previously-admitted to the respective region;
       when the compared metrics match, admitting the candidate pixel block to the respective region;
   upon conclusion of the joining, determining from the respective region's shape, whether the respective region is likely to exhibit banding artifacts from the video coding/decoding process;
   disqualifying from anti-banding processing regions that are determined not likely to exhibit banding artifacts based on their shape;
   when a respective region is not disqualified, applying anti-banding processing to pixel blocks within at least one of the respective region; and
   coding the frame for transmission over a channel by a compression operation, the coding being applied to a frame comprised of the processed data of the anti-banding processed pixel blocks and source data of remaining pixel blocks.

2. The method of claim 1, further comprising:
   comparing metrics of a given pixel block that belongs to the respective region to corresponding metrics of the respective region as a whole, and
   removing the given pixel block from the respective region based on results of the comparison.

3. The method of claim 1, further comprising:
   estimating smoothness of image content within the respective region, and
   removing the given pixel block from the respective region when smoothness of the pixel block's image content is sufficiently different from the estimated smoothness of the respective region.

4. The method of claim 1, further comprising:
   estimating a size of the respective region, and
   disqualifying the respective region from anti-banding processing based on the respective region's size.

5. The method of claim 1, further comprising:
   estimating a temporal persistence of the respective region, and
   applying anti-banding processing to the respective region if the temporal persistence exceeds a predetermined threshold.

6. The method of claim 1, wherein the anti-banding processing comprises adding noise to content of pixel blocks within the respective region prior to the coding.

7. The method of claim 1, wherein the anti-banding processing comprises altering filtering operations to be applied to pixel blocks within the respective region as compared to pixel blocks that have no anti-banding processing applied to them.

8. The method of claim 1, wherein the anti-banding processing comprises altering quantization parameters to be applied to pixel blocks within the respective region during coding as compared to pixel blocks that have no anti-banding processing applied to them.

9. The method of claim 1, further comprising determining a mean value of a characteristic of the candidate pixel block and comparing the mean value to a mean value of the characteristic of the candidate region.

10. The method of claim 1, further comprising determining a variance value of a characteristic of the candidate pixel block and comparing the variance value to a variance value of the characteristic of the candidate region.

11. A video coder, comprising:
a preprocessor configured to:
partition each frame of source video into a plurality of pixel blocks, detect region(s) of flat pixel blocks according to a region-growing process, the region-growing process including:
identifying candidate pixel blocks in a frame based on their individual statistic,
selecting a starting candidate pixel block as part of a candidate region,
comparing metrics of the candidate region to metrics of the starting candidate pixel block that shares a border with a pixel block previously-admitted to the respective region, and
when the compared metrics match, growing the candidate region by joining the candidate pixel block to the candidate region;
remove pixel block(s) from the candidate region based on the respective region's shape;
upon conclusion of growing and removing, determine from the respective region's shape, whether the respective region is likely to exhibit banding artifacts;
disqualify from anti-banding processing regions that are determined not likely to exhibit banding artifacts based on their shape;
add noise to the pixel blocks remaining in the candidate region; and
code the frames, including modified pixel blocks by predictive coding.

12. The video coder of claim 11, wherein the region-growing process comprises recursively joining a candidate pixel block to the candidate region when the candidate pixel block is identified as being flat and shares a border with another pixel block previously-admitted to the candidate region.

13. The video coder of claim 11, wherein the region-growing process comprises:
for a candidate pixel block that is identified as being flat and shares a border with another pixel block previously admitted to the candidate region, comparing metrics of the candidate pixel block to corresponding metrics of pixel blocks previously admitted to the candidate region, and
adding the candidate pixel block to the candidate region based on results of the comparison.

14. The video coder of claim 11, wherein the preprocessor performs removing by:
estimating smoothness of image content within the candidate region, and
removing the select pixel block(s) from the candidate region when smoothness of the select pixel block(s)'s image content is sufficiently different from the estimated smoothness of the candidate region.

15. The video coder of claim 11, wherein the preprocessor further:
estimates a size of one of the candidate regions, and
disqualifies the candidate region from anti-banding processing based on the candidate region's size.

16. The video coder of claim 11, wherein the preprocessor further:
estimates a temporal persistence of one of the candidate regions, and
applies anti-banding processing to the candidate region if the temporal persistence exceeds a predetermined threshold.

17. The video coder of claim 11, wherein the preprocessor further:
determines means and variances of individual pixel blocks within the candidate region; and
determines, if the means and variances of the individual pixel blocks within the candidate region differ from a mean and variance of the candidate region as a whole, that the candidate region is not a candidate for further anti-banding processing.

* * * * *